Oct. 14, 1952 P. L. BORN 2,613,535
LIQUID LEVEL GAUGE
Filed Dec. 8, 1949 3 Sheets—Sheet 3

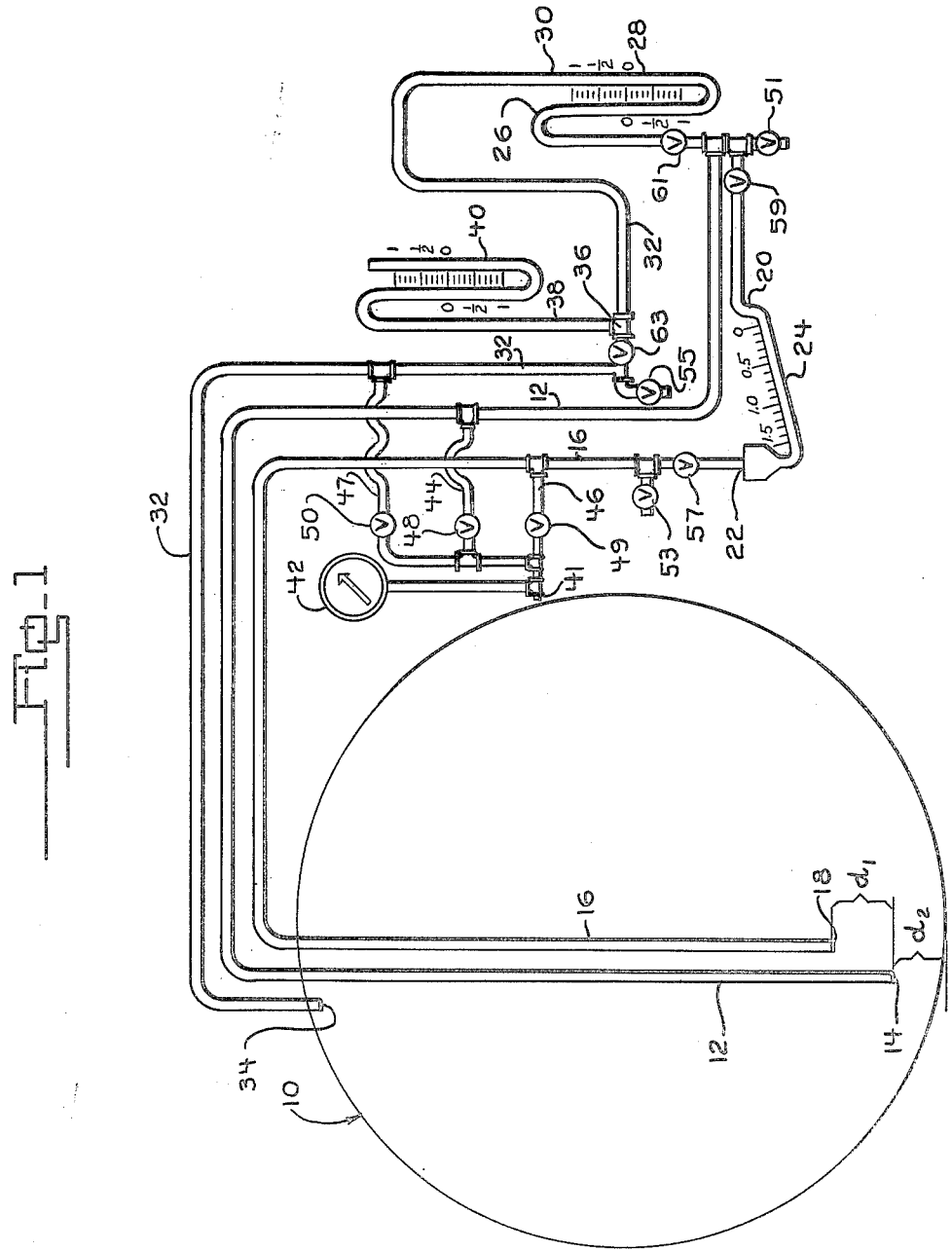

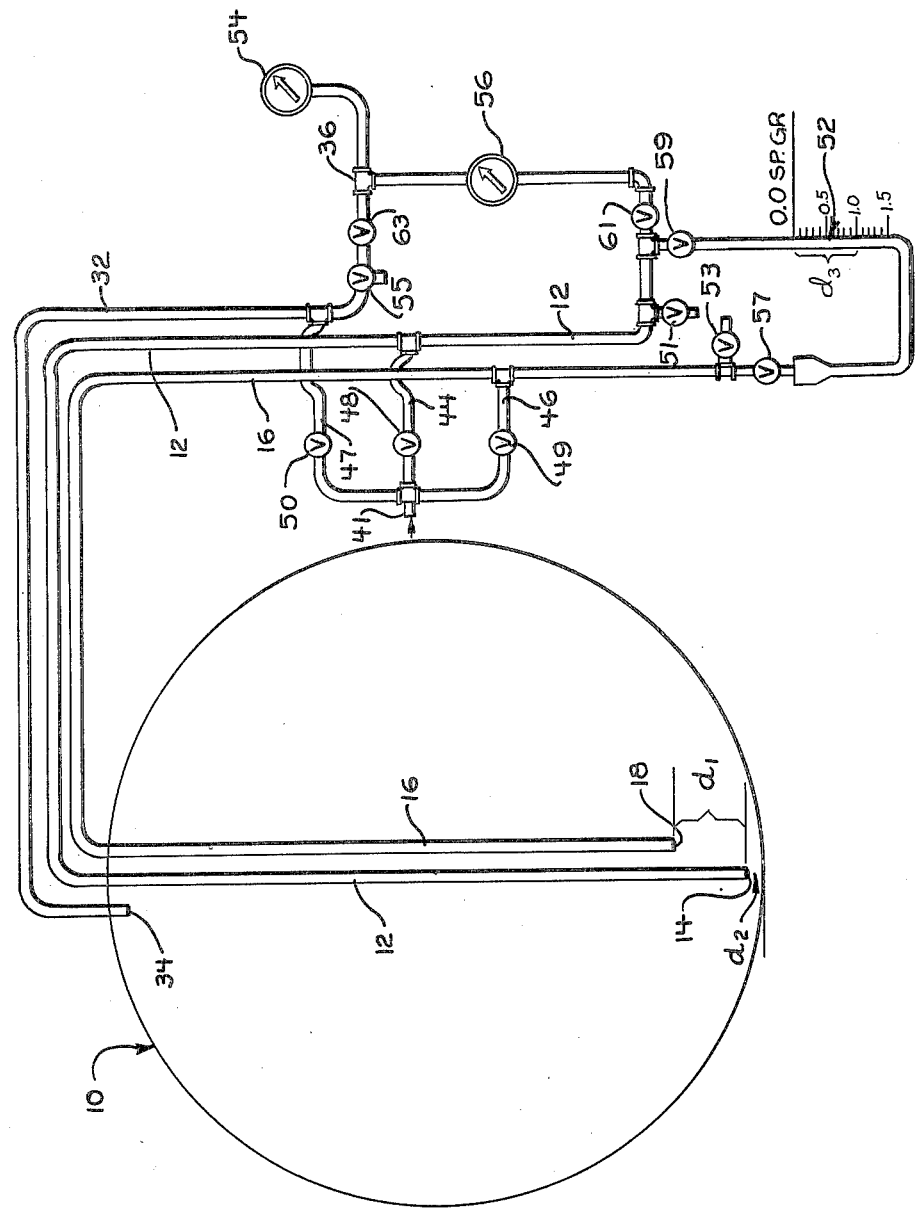

INVENTOR
Paul L. Born
BY Brown, Jackson, Boettcher & Dienner.
ATTORNEYS

Patented Oct. 14, 1952

2,613,535

UNITED STATES PATENT OFFICE 2,613,535

LIQUID LEVEL GAUGE

Paul L. Born, Wilmette, Ill.

Application December 8, 1949, Serial No. 131,833

2 Claims. (Cl. 73—299)

This invention relates to a device for accurately measuring the liquid contents of a storage tank when it is either impossible to open a tank to obtain accurate depth measurement directly or when the tank is inconveniently located for such direct measurement.

Conventional devices for measuring the liquid contents of a storage tank when direct access thereto is inconvenient or impossible usually require that the specific gravity of the liquid in the tank be known in order to obtain accurate results as to the contents of the tank.

My invention provides for the accurate measurement of the quantity of liquid in a storage tank when the specific gravity of the liquid to be measured is unknown and when direct access to the tank is infeasible or impossible. My device provides a measurement not only of the depth of the liquid in the tank but also its specific gravity. Consequently, it is possible to know not only the height of the liquid in the tank but also the cubic volume and weight of liquid therein when the dimensions of the tank are known.

Reference should now be made to the figures of the drawings and the following more specific description for a complete understanding of the invention.

Figure 1 illustrates my invention employed in connection with a cylindrical storage tank;

Figure 2 illustrates a modification of the structure of Figure 1;

Figure 4:
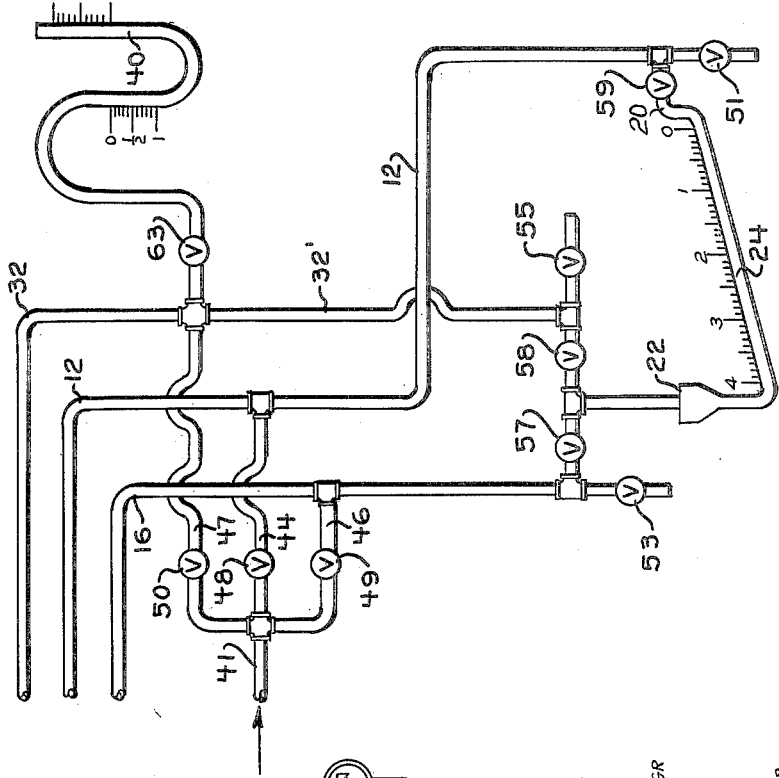
Figure 4 is a fragmentary showing of another modification of the structure of Figure 1.

Referring now to Figure 1 of the drawings, there will be seen a cylindrical liquid storage tank, indicated generally by the reference numeral 10. It will be appreciated that the liquid storage tank could take other shapes than that of a cylindrical tank. Extending into the tank is a first conduit 12 which has an open end 14 disposed adjacent the bottom of the tank 10. Preferably, the conduit is introduced through the top of the tank, but it will be understood that it may enter the tank from other locations. While the open end of the conduit 12 might be disposed at the very bottom of the tank, it is desirable to have said open end disposed a slight distance above the bottom of the tank so that any sediment which may collect therein will not cover the open end 14 of the conduit 12. Also extending into the tank 10 is a second conduit 16 which has an open lower end 18 disposed at a known higher level than the level of the open end 14 of conduit 12. This known difference in levels is indicated in Figure 1 as $d_1$. The distance between the lower end 14 of conduit 12 and the very bottom of the tank 10 is indicated by the reference numeral $d_2$. Preferably, the conduit 16 also enters the tank at the uppermost portion thereof, but it will be understood that it might enter through other locations.

The conduits 12 and 16, the first and second conduits, respectively, are connected to opposite ends 20 and 22, respectively, of a differential pressure gauge 24, the fluid-measuring medium being of a known specific gravity. For example, mercury, having a specific gravity of 13.56, may be employed in the gauge, and the gauge may be inclined, as shown in Figure 1 of the drawings. The distance $d_1$ between the openings 14 and 18 of the first and second conduits 12 and 16, respectively, may be 13.56 inches, so that the numerical indication of the distance $d_1$ in linear units corresponds to the specific gravity of the fluid in the differential pressure gauge 24. If the distance $d_1$ is 13.56 inches, one inch of vertical rise or fall of the mercury in the column of the differential pressure gauge 24 corresponds to a unit of specific gravity. A vertical rise or fall of another inch along the column will correspond to another unit of specific gravity, so that it may be seen that specific gravity of the liquid in the storage tank may be read directly from the differential pressure gauge 24 by marking graduations thereon at intervals corresponding to one inch of vertical rise of the mercury in the tube. It will be understood that the distance $d_1$ might be multiples or fractions of the specific gravity of the fluid in the gauge. If, for example, the distance $d_1$ were twice 13.56 inches when the gauge 24 contains mercury, then two inches of vertical rise or fall on the inclined mercury gauge 24 would correspond to a unit of specific gravity. If the distance $d_1$ were one half of 13.56 inches, then one-half inch vertical rise or fall on the gauge would correspond to one unit of specific gravity.

If the distance $d_1$ and the extent of rise or fall of the measuring fluid in gauge 24 are expressed in inches, then $d_1$ should equal numerically the product of the specific gravity of the measuring fluid used in gauge 24 times that vertical rise or fall of the measuring fluid corresponding to a unit of specific gravity as marked on gauge 24.

The differential pressure gauge 24, by being inclined, provides a greater length than would be conveniently possible if the gauge were disposed completely vertically and, accordingly, fractional graduation between successive units of specific gravity, as marked on gauge 24, can be spaced apart greater distances for more accurate readings.

Said first conduit 12 is also connected in parallel with one side 26 of a mercury differential pressure gauge 28, the other side 30 of which is connected a third conduit 32. The open end 34 of said third conduit 32 is positioned within the tank 10 at its uppermost portion. It will be seen that the conduit 32 has a T-connection, as at 36, with a conduit 38 leading to a pressure gauge 40 which is adapted to indicate the difference in pressure between atmosphere and the pressure existing at the open end 34 of conduit 32 which is in the uppermost portion of tank 10. Gauge 40 may be a mercury gauge or a dial gauge like gauge 54 of Figure 2.

Dry, non-condensable gas, such as nitrogen, under pressure is adapted to be led from a suitable source (not shown) through the conduit 41 and past pressure gauge 42 to the parallel conduits 44, 46 and 47 which connect, respectively, with said first conduit 12 through needle valve 48, with said second conduit 16 through needle valve 49, and with the third conduit 32 through needle valve 50.

When it is desired to determine the height of the liquid in the storage tank, or the volume or weight of the liquid in the tank, the needle valves 48, 49 and 50 of the conduits 44, 46 and 47, respectively, are opened slightly so that any liquid within the conduits 12, 16 and 32 will be driven back into the tank with a small amount of gas bubbling into the liquid through the conduits 12 and 16. If desired, sight feed bubblers of a known type may be interposed between the needle valves 48, 49 and 50 and conduits 12, 16 and 32 so that a person taking the measurement may see that sufficient gas is being admitted to conduits 12, 16 and 32 to drive the liquid out of said conduits and into the tank. A dry gas chosen to suit the gaseous atmosphere in the storage tank and of a pressure sufficient to overcome the pressure in the bottom of the storage tank is employed for this purpose.

During periods of non-use all stop valves at the inlets of gauges 24, 28 and 40 are closed (see the stop valves 57 and 59 for gauge 24, stop valves 61 and 63 for gauges 28 and 40) to prevent accumulation of liquids. At the time when gas is admitted by way of conduit 41 and parallel conduits 44, 46 and 47 to the conduits 12, 16 and 32, it is desirable to open said latter conduits adjacent their lower ends, at their respective drain valves 51, 53 and 55, and leave them open until gas appears. That allows the gas to drive out any accumulated liquids which cannot be driven back into tank 10. Then the drain valves are closed and the stop valves are opened and measurements are taken, after which the stop valves are closed.

At this time the person taking the measurements can read directly from the pressure differential gauge 24 the specific gravity of the liquid in the tank, and from the gauge 28 is enabled to know the pressure differential existing between the uppermost portion of the tank and the lowermost portion, that is, between the open end 34 of conduit 32 and the open end 14 of conduit 12. The reading at the gauge 28 will be in inches of mercury. At this time also it is possible to tell from reading the gauge 40 the difference in pressure between atmosphere and that existing in the uppermost portion of the tank, if the tank is sealed from atmosphere. This latter reading may be useful in storage tanks which are sealed from atmosphere. Since the pressure existing at any level in the liquid in the tank is directly proportional to the specific gravity of the liquid and the height above that level the person taking the reading can immediately compute the height of the liquid in the tank from the following simple formula:

$$\frac{\text{Reading at gauge 28}}{\text{Reading at gauge 24}} \times 13.56 = \text{number of inches of liquid in the tank}$$

This can be expressed in feet of liquid in the tank by dividing 13.56 by the number of inches in a foot. The formula then reads:

$$\frac{\text{Reading at gauge 28}}{\text{Reading at gauge 24}} \times 1.129 = \text{feet of liquid in the tank}$$

This height is the height of the liquid above the open lower end 14 of conduit 12. Since the distance $d_2$ from the very bottom of the tank 10 to the level of the lower open end 14 of conduit 12 is known, the actual height of the liquid above the bottom of the tank is immediately ascertainable.

If it is further desired to know the cubic content of the liquid in the tank, that can readily be computed from the known height of the liquid in the tank, together with the dimensions of the tank which will be available from the tank manufacturer's specifications. If it is also desired to know the weight of the liquid in the tank, that can be computed from the volume, since the specific gravity of the liquid is also known from the reading at gauge 24.

In Figure 2 there is shown a modification of the invention, but the structure which corresponds to that shown in Figure 1 bears the same reference numerals for ease in identification of the various parts. One of the differences between the structure shown in Figure 2 and that shown in Figure 1 comprises the substitution of an alternate form of pressure differential gauge 52 to the opposite ends of which are connected the first conduit 12 and the second conduit 16. This pressure differential gauge 52 is adapted to contain liquid of a lower specific gravity than that shown in the inclined mercury gauge 24 of Figure 1. Assuming that the fluid in the pressure differential gauge 52 consists of water of a specific gravity of 1.0, then the distance represented by the reference numeral $d_3$ on gauge 52 will be the same as the distance $d_1$ between the open ends 14 and 18, respectively, of the conduits 12 and 16. The distance $d_3$ will correspond to one unit of specific gravity. If, for example, distance $d_1$ equals 13.56 inches, each unit of specific gravity on the gauge 52 will be represented by 13.56 inches of vertical rise or fall on the scale of said gauge. Of course, measuring fluids of other specific gravities may be employed in gauge 52, if the distance $d_1$ and spacing of units of specific gravity on the scales of the gauge are appropriately selected.

Suitable shut-off valves and drain valves are interposed in the conduits 12, 16 and 32 as in the structure of Figure 1.

For the pressure differential gauge 40 of Figure 1, there may be substituted a dry type gauge, such as a gauge 54. Also, for the vertical differential mercury gauge 28 of Figure 1 there may be substituted a dry type gauge, such as the gauge 56. If gauge 56 is adapted to be graduated in pounds per square inch, then to obtain a reading of feet of liquid in the tank, the formula will be the following:

$$\frac{\text{Reading at gauge } 56}{\text{Reading at gauge } 52} \times \frac{144}{62.4} = \text{feet of liquid in the tank}$$

or $$\frac{\text{Reading at gauge } 56}{\text{Reading at gauge } 52} \times 2.309 = \text{feet of liquid in the tank}$$

As in the case of the device of Figure 1, the cubic contents of the tank may then be computed, knowing the measurements of the tank, and the weight of the liquid can be determined.

It is desirable, in using either the structure of Figure 1 or Figure 2, to take a measurement of the temperature of the liquid in the tank when the readings at gauges 24 and 28, or 52 and 56, are taken to assist in determining the volume of liquid in the tank at a standard temperature, or to assist in identifying the components of a mixture of liquids in the tank. Since the volume of the liquid in the tank is known and since the dimensions of the tank are also known, the volume of gas in the tank above the liquid can also be readily determined.

It will be appreciated that all, or portions, of conduits 12, 16 and 32 might be chambered sections of a single pipe or three concentric pipes.

Figure 3:
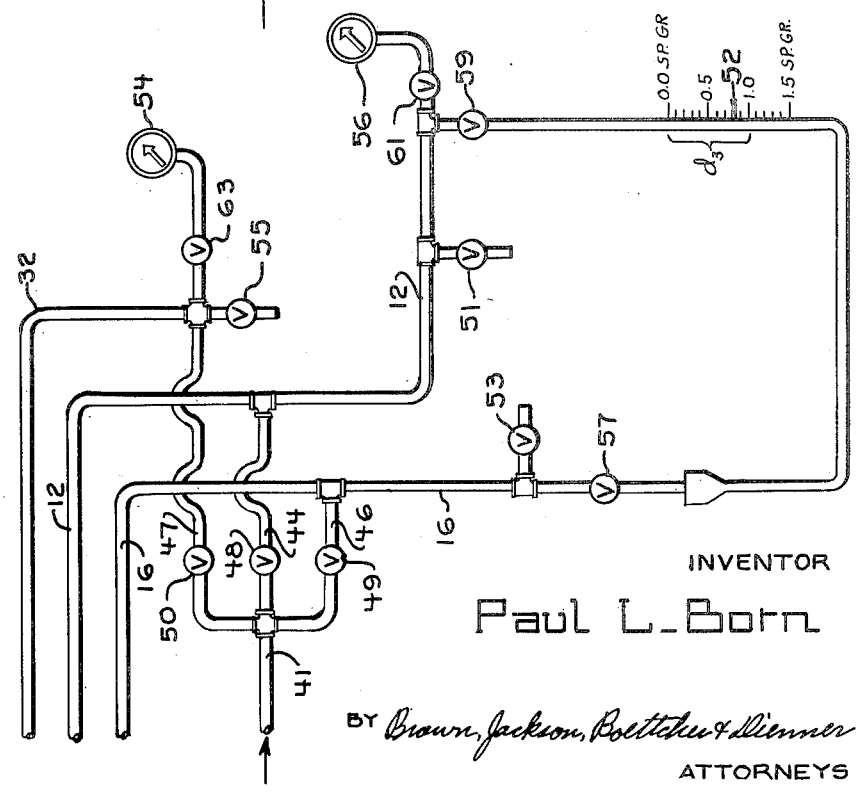
Figure 3 is a fragmentary showing of another modification of the structure of Figure 1.

Also, as shown in Figure 3, the gauge 56 of Figure 2 could be connected to conduit 12 and not between conduit 12 and conduit 32. In such event, the person taking the readings would need to take the difference between the pressure readings of the two gauges 54 and 56 instead of having it indicated on a single pressure differential gauge.

As shown, in Figure 4, the pressure differential mercury gauge 28 can be dispensed with if the conduit 32 is connected, as by its extension 32', to the end 22 of pressure differential gauge 24, through the shut-off valve 58. With such connection 32', gauge 24 may be used to take a reading of the difference in pressure between the inlet 34 of conduit 32 and the inlet 14 of conduit 12, provided valve 57 in conduit 16 is closed. It will be understood that the scale on gauge 24 must be made long enough to measure the total height of liquid in the tank in inches of mercury. For example, a nine-foot diameter propane tank lying as shown in Figure 1 will require that gauge 24 be able to read as high as four inches of mercury.

In other words, conduits 16 and 32 can alternately be connected to the end 22 of gauge 24 by appropriately opening or closing their respective shut-off valves 57 and 58. Because distance $d_1$ is 13.56 inches and because the specific gravity of the measuring liquid (mercury) in the gauge 24 is 13.56, the scale on gauge 24 will indicate units of specific gravity of the fluid in tank 10 by inches of vertical rise of mercury in gauge 24.

The same scale (expressed in inches of vertical rise) can then be used when taking the difference in pressure between inlet 34 of conduit 32 and inlet 14 of conduit 12, since the position of the measuring fluid will indicate the difference in pressure in inches of mercury. For feet of liquid in the tank the following formula may be employed:

$$\frac{\text{2nd reading}}{\text{1st reading}} \times 1.129 = \text{feet of liquid in tank}$$

While I have shown preferred embodiments of the invention, it will be appreciated that modifications thereof may be made, without departing from the scope of the invention, and I do not intend to be limited to the illustrated embodiments, except insofar as the appended claims are so limited.

I claim:

1. A gauging device for a storage tank comprising a first conduit adapted to extend into the tank and have an opening adjacent the bottom of the tank and a second conduit adapted to extend into the tank and have an opening at a known higher level than the opening of said first conduit, said first and second conduits being connected with opposite ends of a differential pressure gauge, the specific gravity of the measuring fluid in said gauge being known, and a third conduit adapted to extend into said tank and have an opening adjacent the top of the tank, said third conduit and said first conduit being connected with opposite ends of a differential pressure gauge.

2. A gauging device for a storage tank comprising a first conduit adapted to extend into the tank and have an opening adjacent the bottom of the tank, a second conduit adapted to extend into the tank and have an opening at a known higher level than the opening of said first conduit, and a third conduit adapted to extend into the tank and have an opening adjacent the top of the tank, said first and second conduits being connected with opposite ends of a differential pressure gauge, said first conduit being connected to a pressure gauge, and said third conduit being connected to a pressure gauge.

PAUL L. BORN.

REFERENCES CITED

The following references are of record in the file of this patent:

UNITED STATES PATENTS

| Number | Name | Date |
| --- | --- | --- |
| 548,718 | Mitchell | Oct. 29, 1895 |
| 722,645 | Tripp | Mar. 10, 1903 |
| 795,833 | House | Aug. 1, 1905 |
| 1,519,609 | Field | Dec. 16, 1924 |